United States Patent [19]
Fleckenstein

[11] Patent Number: 5,917,687
[45] Date of Patent: Jun. 29, 1999

[54] FAULT-CURRENT PROTECTOR MEANS

[75] Inventor: Hans-Jürgen Fleckenstein, Schimborn, Germany

[73] Assignee: Heinrich Kopp AG, Kahl Am Main, Germany

[21] Appl. No.: 08/988,436

[22] Filed: Dec. 11, 1997

[30] Foreign Application Priority Data

Dec. 12, 1996 [DE] Germany ............................ 196 51 718

[51] Int. Cl.$^6$ ....................................................... H02H 3/16
[52] U.S. Cl. ................................................ 361/45; 361/42
[58] Field of Search ................................. 361/42–50, 57, 361/93, 94

[56] References Cited

U.S. PATENT DOCUMENTS

| 5,224,006 | 6/1993 | MacKenzie et al. ..................... 361/45 |
| 5,708,551 | 1/1998 | Bosatelli .................................. 361/62 |

*Primary Examiner*—Ronald W. Leja
*Attorney, Agent, or Firm*—Skjerven, Morrill, MacPherson, Franklin & Friel LLP; Alan H. MacPherson; Hugh H. Matsubayashi

[57] ABSTRACT

Fault-current protector circuitry has a first totalling current transformer (7) with a primary winding formed from phase (1) and neutral (2) conductor lines and a secondary winding (13) connected to a first analyzer circuit (16). A second totalling current transformer (10) has a primary winding formed by a protective conductor line (3) and a secondary winding (17) connected to a second analyzer circuit (20). A trigger device (24) connected to the first and second analyzer circuits actuates switches (4,5,6) which are connected into each conductor (1,2,3). The fault-current protector circuitry is especially for isolation monitoring of electrical circuits and which has the advantage of reliably isolating the monitored circuit from the mains if fault currents occur in the phase or neutral conductor lines and if a current appears in the protective conductor line.

16 Claims, 2 Drawing Sheets

FAULT-CURRENT PROTECTOR MEANS

The invention relates to a fault-current protector means for monitoring the insulation of electrical circuits.

In compliance with DIN Standard VDE 0661, mobile protection means may detect differential fault currents via a totaling current transformer, which currents flow from active conductors carrying an operating current, i.e. from phase and neutral conductors, to ground in the case of faults or from non-fused earthed conductors carrying a faulty voltage from the live safety contacts via the non-fused earthed conductor to ground. When a response threshold is exceeded the two active conductors and the non-fused earthed conductor are isolated from the mains. Upon the detection of fault currents, the mobile protection means in accordance with DIN Standard VDE 0661 disconnects the circuit to be monitored at all poles, i.e. inclusive of the non-fused earthed conductor.

The isolation of the non-fused earthed conductor from the mains may, however, entail inexpedient effects. When an operating device or working equipment such as a drilling machine is connected to the mains via a conventional protection means, there is no sufficient protection from an electrical contact with a line carrying an extraneous voltage, e.g. by drilling into the line. After the line carrying an extraneous voltage has been drilled, this extraneous voltage is applied to the housing of the working tool and gives rise to a fault current through the totaling current transformer of the protector means which responds with disconnection of the working equipment on all poles, i.e. inclusive of the non-fused earthed conductor PE. As a result of this disconnection, the non-fused earthed conductor PE loses its function, and an operator handling the working tool is in lethal series contact with the extraneous voltage until a series-connected protective element disconnects.

In order to avoid this disadvantage, protector means have been developed which do not disconnect the non-fused earthed conductor in the case of fault currents caused by an extraneous voltage from an external network or by faults on the mains side. In these protector means the non-fused earthed conductor is passed by the totaling current transformer. The totaling current transformer in these protector means can therefore not be used to detect a voltage applied on the non-fused earthed conductor. These protector means are therefore equipped with an additional sensor for detecting a voltage occurring on the non-fused earthed conductor. This sensor utilizes the resistance of the body of the person handling the working equipment for detection of a voltage present on the non-fused earthed conductor. As the operator contacts the housing of the working equipment, which is connected to the non-fused earthed conductor, e.g. with his or her hand, a current is discharged via the operator's body resistance to ground when a voltage occurs on the non-fused earthed conductor. As the operator's body resistance is comparatively high when the operator is well insulated from ground, e.g. because appropriate footwear is worn, the sensor must have a high sensitivity, which means that it must also be able to detect very weak currents. These high demands on the sensor may result in restrictions in terms of the operability of the protector means. Another serious disadvantage of these protector means including a sensor consists in the fact that the sensor is too insensitive if the operator has a very high ground resistance, which means that it does not detect the body current flowing via the operator's body. In such a case the protector means may be switched on even though a voltage is present on the non-fused earthed conductor and hence at the housing of the working equipment, which is dangerous to contact. Such a dangerous voltage may be induced, for instance, by the fact that the phase conductor and the non-fused earthed conductor are exchanged due to incorrect connection. The operator's ground resistance depends on the circumstances of each case and on the environment of the person. As the magnitude of the current detected by the sensor is a function of this operator's ground resistance, which is not defined, the flowing ground current may remain below the lower sensitivity threshold of the sensor so that the protector means is not disconnected in any case, even when a voltage is applied on the non-fused earthed conductor which is dangerous to contact. This voltage dangerous to contact induces a body current flowing through the operator's body which even though it has a small current value may yet be lethal.

The invention is therefore based on the problem of proposing a protector means which will reliably disconnect the circuit to be monitored from the mains whenever fault currents occur on the phase or neutral conductor and in response to occurrence of a body current on the non-fused earthed conductor.

This problem is solved by a protector means presenting the features defined in Patent Claim 1.

Preferred further embodiments of the invention derive from the dependent claims.

Embodiments of the inventive fault-current protector means are illustrated in the drawings and will be described in the following for explanation of additional features.

Figure 1:
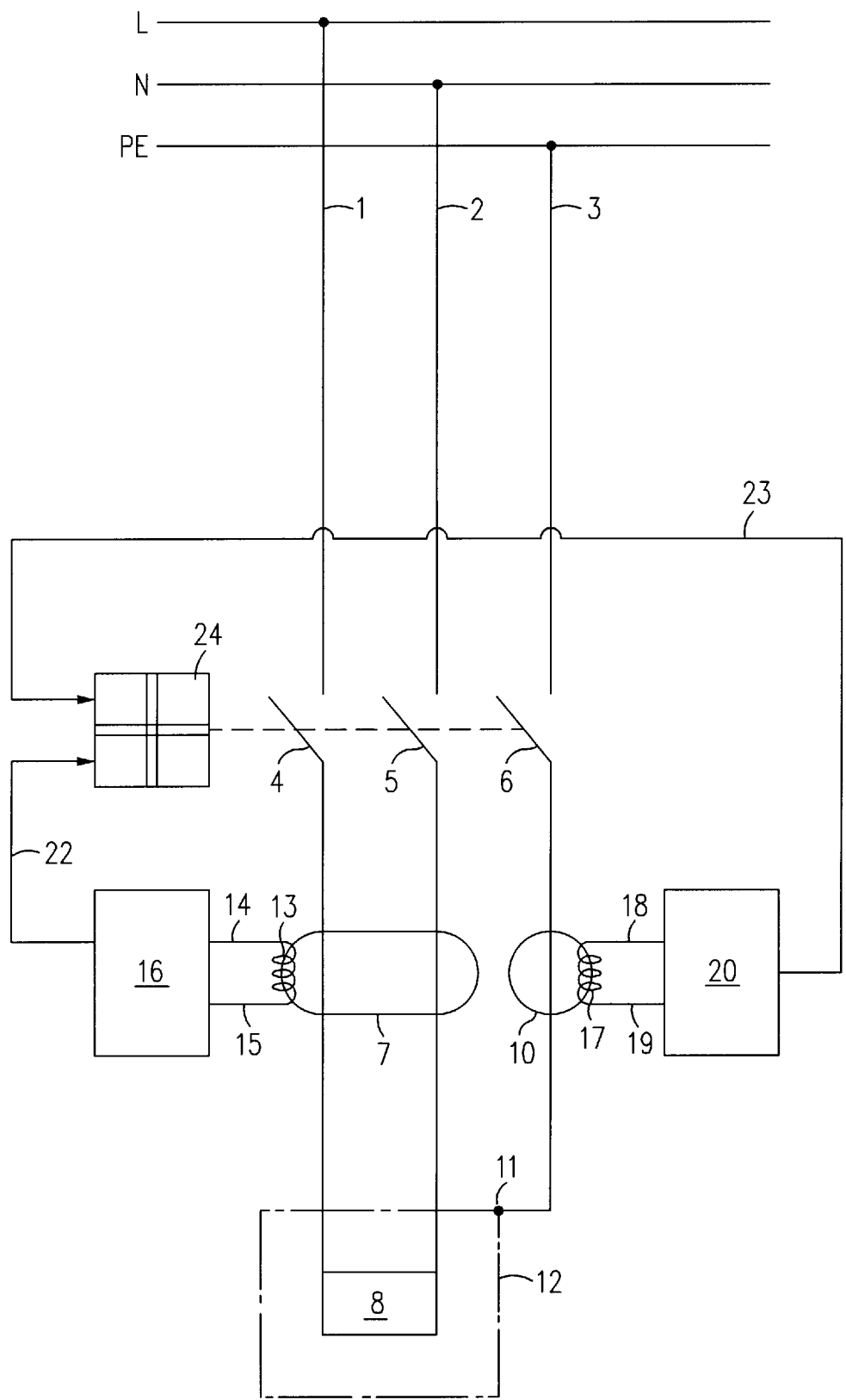
FIG. 1 shows a first embodiment of the inventive fault-current protector means.

First of all, the structure of the inventive fault-current protector means illustrated in FIG. 1 will be described. The reference numeral 1 denotes the phase conductor L, numeral 2 applies to the neutral conductor N, and 3 refers to the non-fused earthed conductor PE, also called a protective conductor line PE.

The block diagram in FIG. 1 shows a preferred embodiment of a fault current leakage guard switch in accordance with the invention.

In FIG. 1, the phase conductor is identified by numeral 1, the neutral conductor by numeral 2 and the non-fused earthed conductor by numeral 3. In each of the conductors 1, 2, 3, a respective switch 4, 5, 6 is connected, with a mechanical coupling among the switches. The phase and neutral conductors 1, 2 are passed through a first totaling current transformer 7 which, seen from the conductors 1, 2, 3, is located behind the switches 4, 5. The phase and neutral conductors 1, 2 constitute the primary winding of the totaling current transformer 7. A load circuit 8 is connected to the conductors 1, 2, e.g. the motor of a drilling machine. The non-fused earthed conductor 3 moreover constitutes the primary winding of a second totaling current transformer 10 which is disposed behind the switch 6. The non-fused earthed conductor 3 is connected to a terminal point 11 on the housing 12 which is outlined in dashed lines and accommodates the load circuit 8. The first totaling current transformer 7 includes a secondary winding 13 which is connected to a first analyzer circuit 16 via lines 14, 15. The second totaling current transformer 10 includes a secondary winding 17 which is connected to a second analyzer circuit 20 via lines 18, 19. The first and second analyzer circuits 20 are connected via a respective control line 22 or 23 to a trigger means 24. The trigger means 24 is mechanically coupled with the switches 4, 5, 6 for activating them.

In the following, the mode of operation of the inventive fault-current protector means illustrated in FIG. 1 will be described.

The first analyzer circuit 16, which is connected to the secondary winding 13 of the first totaling current transformer 7, detects a fault current flowing on the phase conductor 1 or the neutral conductor 2, and then issues a control signal via the control line 22 to the trigger means 24 without any delay. The first analyzer circuit 16 has a low response threshold and furnishes a control signal in response to small fault currents occurring on the lines 1, 2 to the trigger means 24. The trigger means 24 then opens the switches 4, 5, 6 on all poles so that the circuit 8 to be monitored and its housing 12 will be disconnected from the mains.

Improper insulation which induces the fault currents on the lines 1, 2 are detected by the analyzer circuit 16, and the operator handling the load is protected by the switches 4, 5, 6 opening as soon as a fault current is detected.

The second analyzer circuit 20, which is connected to the secondary winding 17 of the second totaling current transformer 10, includes a detector for sensing a defined range of current values of the current flowing on the non-fused earthed conductor 3, which detector is not identified in detail. When the current value is within the defined range of current values, the second analyzer circuit 20 generates a control signal via the control line 23 to the trigger means 24. Upon receipt of the control signal, which arrives through the control line 23, the trigger means 24 opens the switches 4, 5, 6 so that the circuit 8 to be monitored, inclusive of the housing 12, will be disconnected from the mains.

The second analyzer circuit 20 preferably includes a delay circuit for passing the control signal on to the trigger means 24 via the control line 23 with a delay in time. The delay created by the delay circuit should preferably be adjustable and it is preferred that it corresponds to 30 to 40 ms.

When the current of the power flowing on the non-fused earthed conductor is beyond the defined range of current values, the analyzer circuit 20 does not produce a control signal for the trigger means 24. The range of current values, within which the analyzer circuit 20 issues a control signal to the trigger means, should preferably be adjustable. The adjustable range of current values is defined by a lower threshold and an upper threshold. In a preferred embodiment, the lower threshold of the range of current values ranges at 0 A whilst the upper threshold ranges at some 0.5 A to 1 A.

When the magnitude of the current flowing on the non-fused earthed conductor 3 exceeds the upper threshold of the adjustable range of current values, the switches 4, 5, 6 are not opened by the trigger means 24. This provision prevents fault currents, which are due to an extraneous voltage, from occurring on the non-fused earthed conductor 3, which would result in the opening of switch 6 so that the non-fused earthed conductor 3 would lose its function. If the switch 6 were open, the operator would be in principal contact with the extraneous voltage until a series-connected protector means disconnects. When the range of current values is defined, the fact is considered that the magnitudes of fault currents, which are induced by an extraneous voltage, are much higher than, 0.5 A to 1 A. The reason for this is the fact that, e.g. in the case that a line is drilled which carries an extraneous voltage, the resistance to the extraneous voltage assumes ever lower values, which means that the conductors are bridged in a low-impedance form with values smaller than 250 Ohm. The second analyzer circuit 20 detects the high fault current flowing on the non-fused earthed conductor 3 as a current which has been caused by an extraneous current and controls the trigger means 24 such that the switches 4, 5, 6 will not be opened but will rather remain closed.

When the magnitude of the current flowing through the non-fused earthed conductor 3 is, however, smaller than the upper threshold of the range of current values, which is set in the second analyzer circuit 20, the second analyzer circuit 20 detects this current as a body current flowing to ground in principal contact via the operator's body resistance. In this case, a control signal is delayed and issued to the trigger means 24 whereupon the switches 4, 5, 6 are opened on all poles. Due to the switch 6 being open, the body current flowing to ground via the non-fused earthed conductor 3 and the operator's comparatively high body resistance is interrupted. The disconnection by the second analyzer circuit 20 is performed with a delay so that in the event of a rapid change of the current on the non-fused earthed conductor 3 from 0 A to a current above the upper threshold, the switch 6 will not be opened in the meantime. This provision ensures that the switch 6 is opened only when the magnitude of the current flowing via the non-fused earthed conductor 3 is below the upper threshold.

The inventive protector means hence includes two protector systems which operate entirely independently of each other. The first protector system, which consists of the first totaling current transformer 7, the first analyzer circuit 16 and the trigger means 24, causes the switches 4, 5, 6 to open in the event of any fault current on the mains side, irrespectively of the magnitude of the current. The second protector system, which consists of the second totaling current transformer 10, the second analyzer circuit 20 and the trigger means 24, opens the switches 4, 5, 6 on all poles when the magnitude of the current flowing on the non-fused earthed conductor 3 is smaller than an adjustable threshold. When the magnitude of the current flowing on the non-fused earthed conductor 3 is higher than this threshold, the switches 4, 5, 6 are not opened by the second protector system.

In a fault-current protector means which includes a detector for sensing a voltage on the non-fused earthed conductor, a comparatively low sensitivity of the sensor to body currents is sufficient. The second protector system detects even the slightest body currents and causes a safe interruption of the body current by opening the switch 6.

Figure 2:
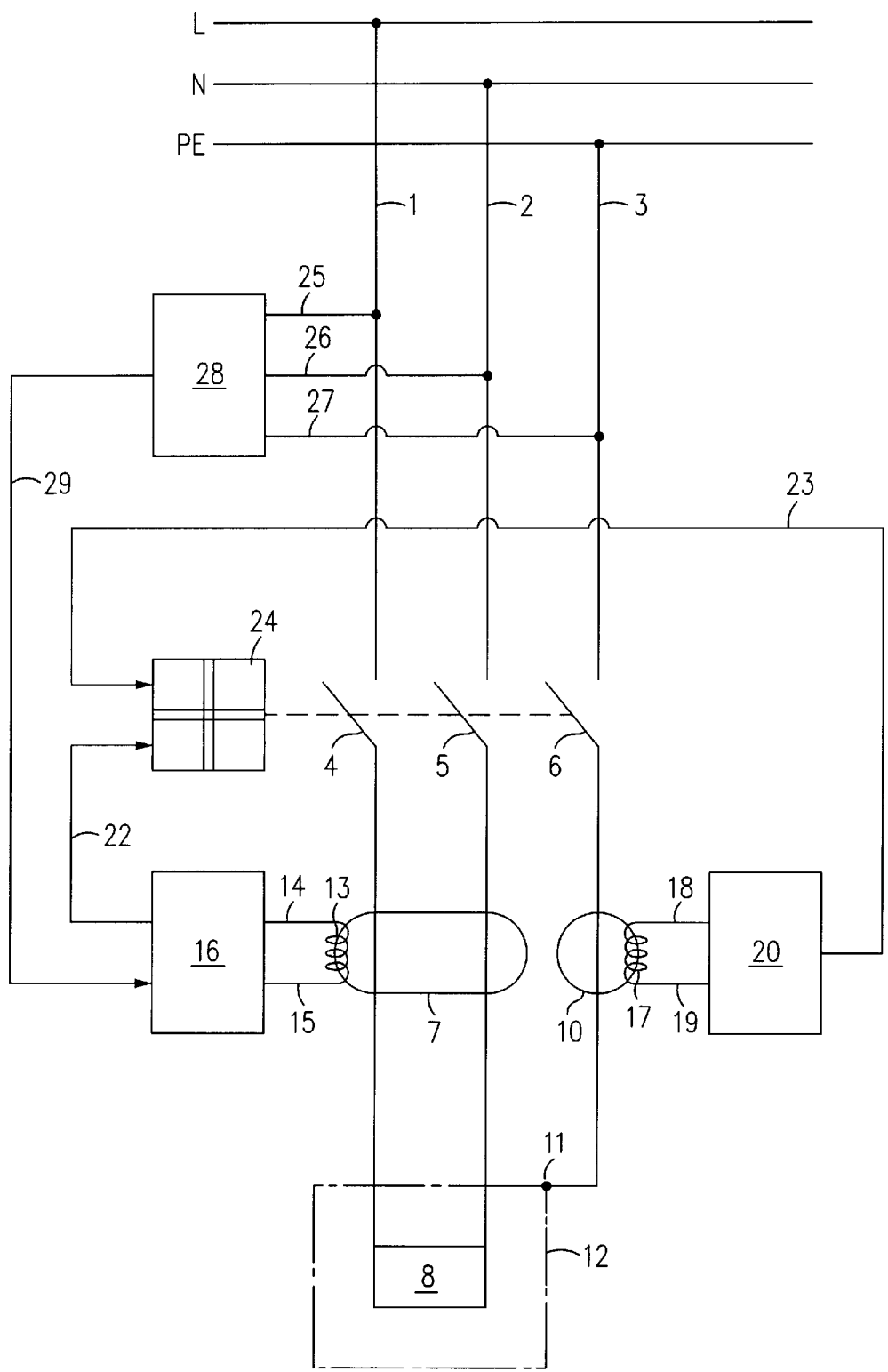
FIG. 2 illustrates a second embodiment of the inventive fault-current protector means including a non-fused earthed conductor detector means.

In another embodiment of the inventive fault-current protector means, which is illustrated in FIG. 2, an additional detector means is provided which senses whether the phase, neutral and non-fused earthed conductors 1, 2, 3 are properly connected. A third analyzer circuit 28 is connected via a first connecting line 25 to the phase conductor 1, via second connecting line 26 to the neutral conductor 2 and via third connecting line 27 to the non-fused earthed conductor 3. The third analyzer circuit 28 is additionally connected via a control line 29 to the first analyzer circuit 16. When the three conductors 1, 2, 3 are properly connected, a current flows into the third analyzer circuit 28, which is limited by resistors not illustrated here. As long as this current or monitoring current, respectively, is flowing, the third analyzer circuit 28 detects the correct connection of the three conductors 1, 2, 3 and issues a control signal via the control line 29 to the first analyzer circuit 16.

When the non-fused earthed conductor is not connected or interrupted, respectively, the monitoring current flowing into the third analyzer circuit 28 is prevented and the third analyzer circuit 28 detects that the conductors 1, 2, 3 are not properly connected. In the event of such a fault the third analyzer circuit 28 issues a trigger control signal via the control line 29 to the first analyzer circuit 16. Upon receipt of the trigger control signal arriving from the third analyzer circuit 28, the first analyzer circuit 16 responds with issuance of a control signal via the control line 22 to the trigger means 24. The trigger means 24 then opens the switches 4, 5, 6 on all poles so as to disconnect the circuit 8 to be monitored, together with its housing 12, from the mains.

In another preferred embodiment the improper connection of the non-fused earthed conductor is signaled to the operator by an indicator or display means.

I claim:

1. Fault-current protector means, particularly for monitoring the insulation of electrical circuits, comprising:
    a first totalling current transformer including a primary winding, which is formed by a phase conductor line and a neutral conductor line, and a secondary winding;
    a first analyzer circuit connected to said secondary winding of said first totalling current transformer;
    a second totalling current transformer including a primary winding which is formed by a protective conductor line and a secondary winding;
    a second analyzer circuit connected to said secondary winding of said second totalling current transformer; and
    a trigger means connected to said first and second analyzer circuits for activating switches connected to the phase conductor line, the neutral conductor line, and the protective conductor line.

2. Fault-current protector means according to claim 1, further comprising a third analyzer circuit for detection whether the phase conductor line, the neutral conductor line, and the protective conductor line are correctly connected to a load circuit and a housing of said load circuit.

3. Fault-current protector means according to claim 1, wherein said second analyzer circuit includes a detector for sensing a defined range of current values of the current flowing on said protective conductor line.

4. Fault-current protector means according to claim 1, wherein said second analyzer circuit contains a delaying circuit.

5. Fault-current protector means according to claim 1, wherein said second analyzer circuit activates, with a delay, said trigger means for opening the switches at a current within said defined range of current values.

6. Fault-current protector means according to claim 2, wherein said third analyzer circuit is provided for detection of an interrupted or non-connected protective conductor line.

7. Fault-current protector means, particularly for monitoring the insulation of electrical circuits, comprising:
    a first totalling current transformer including a primary winding, which is formed by a phase conductor line and a neutral conductor line, and a secondary winding;
    a first analyzer circuit connected to said secondary winding of said first totalling current transformer;
    a second totalling current transformer including a primary winding which is formed by a protective conductor line and a secondary winding;
    a second analyzer circuit connected to said secondary winding of said second totalling current transformer; and
    a trigger means connected to said first and second analyzer circuits for activating switches connected to the phase conductor line, the neutral conductor line, and the protective conductor line;
    wherein said second analyzer circuit includes a detector for sensing a defined range of current values of the current flowing on said protective conductor line, said defined range of current values having a lower value of approximately 0 A and an upper value of between approximately 0.5 A and approximately 1.0 A.

8. Fault-current protector means, particularly for monitoring the insulation of electrical circuits, comprising:
    a first totalling current transformer including a primary winding, which is formed by a phase conductor line and a neutral conductor line and a secondary winding;
    a first analyzer circuit connected to said secondary winding of said first totalling current transformer;
    a second totalling current transformer including a primary winding which is formed by a protective conductor line and a secondary winding;
    a second analyzer circuit connected to said secondary winding of said second totalling current transformer;
    a trigger means connected to said first and second analyzer circuits for activating switches connected to the phase conductor line, the neutral conductor line, and the protective conductor line; and
    wherein said second analyzer circuit includes a detector for sensing a defined range of current values of the current flowing on said protective conductor line, and said second analyzer circuit activates, with a delay, said trigger means for opening the switches at a current within said defined range of current values.

9. Fault-current protector means, particularly for monitoring the insulation of electrical circuits, comprising:
    a first totalling current transformer including a primary winding, which is formed by a phase conductor line and a neutral conductor line, and a secondary winding;
    a first analyzer circuit connected to said secondary winding of said first totalling current transformer;
    a second totalling current transformer including a primary winding which is formed by a protective conductor line and a secondary winding;
    a second analyzer circuit connected to said secondary winding of said second totalling current transformer; and
    a trigger means connected to said first and second analyzer circuits for activating switches connected to the phase conductor line, the neutral conductor line, and the protective conductor line;
    wherein said first analyzer circuit monitors a fault current flowing on the phase conductor line and the neutral conductor line while said second analyzer circuit monitors the current flowing on said protective conductor line.

10. Fault-current protector means according to claim 9, further comprising a third analyzer circuit for detection whether the phase conductor line, the neutral conductor line, and the protective conductor line are correctly connected to a load circuit and a housing of said load circuit, wherein said first analyzer circuit monitors a fault current flowing on the phase conductor line and the neutral conductor line while said second analyzer circuit monitors the current flowing on said protective conductor line.

11. Fault-current protector means according to claim 9, wherein said second analyzer circuit includes a detector for sensing a defined range of current values of the current flowing on said protective conductor line.

12. Fault-current protector means according to claim 9, wherein said second analyzer circuit contains a delaying circuit.

13. Fault-current protector means according to claim 11, wherein said second analyzer circuit activates, with a delay, said trigger means for opening the switches at a current within said defined range of current values.

14. Fault-current protector means according to claim 10, wherein said third analyzer circuit is provided for detection of an interrupted or non-connected protective conductor line.

15. Fault-current protector means, particularly for monitoring the insulation of electrical circuits, comprising:

- a first totalling current transformer including a primary winding, which is formed by a phase conductor line and a neutral conductor line, and a secondary winding;
- a first analyzer circuit connected to said secondary winding of said first totalling current transformer;
- a second totalling current transformer including a primary winding which is formed by a protective conductor line and a secondary winding;
- a second analyzer circuit connected to said secondary winding of said second totalling current transformer; and
- a trigger means connected to said first and second analyzer circuits for activating switches connected to the phase conductor line, the neutral conductor line, and the protective conductor line;
- wherein said second analyzer circuit includes a detector for sensing a defined range of current values of the current flowing on said protective conductor line, said defined range of current values having a lower value of approximately 0 A and an upper value of between approximately 0.5 A and approximately 1.0 A, wherein said first analyzer circuit monitors a fault current flowing on the phase conductor line and the neutral conductor line while said second analyzer circuit monitors the current flowing on said protective conductor line.

16. Fault-current protector means, particularly for monitoring the insulation of electrical circuits, comprising:

- a first totalling current transformer including a primary winding, which is formed by a phase conductor line and a neutral conductor line, and a secondary winding;
- a first analyzer circuit connected to said secondary winding of said first totalling current transformer;
- a second totalling current transformer including a primary winding which is formed by a protective conductor line and a secondary winding;
- a second analyzer circuit connected to said secondary winding of said second totalling current transformer; and
- a trigger means connected to said first and second analyzer circuits for activating switches connected to the phase conductor line, the neutral conductor line, and the protective conductor line;
- wherein said second analyzer circuit includes a detector for sensing a defined range of current values of the current flowing on said protective conductor line, and said second analyzer circuit activates, with a delay, said trigger means for opening the switches at a current within said defined range of current values, wherein said first analyzer circuit monitors a fault current flowing on the phase conductor line and the neutral conductor line while said second analyzer circuit monitors the current flowing on said protective conductor line.

* * * * *